July 29, 1969        G. F. GORDON        3,457,589
APPARATUS FOR STRETCHING PLASTIC FILAMENTS
Filed Dec. 12, 1966        4 Sheets-Sheet 1
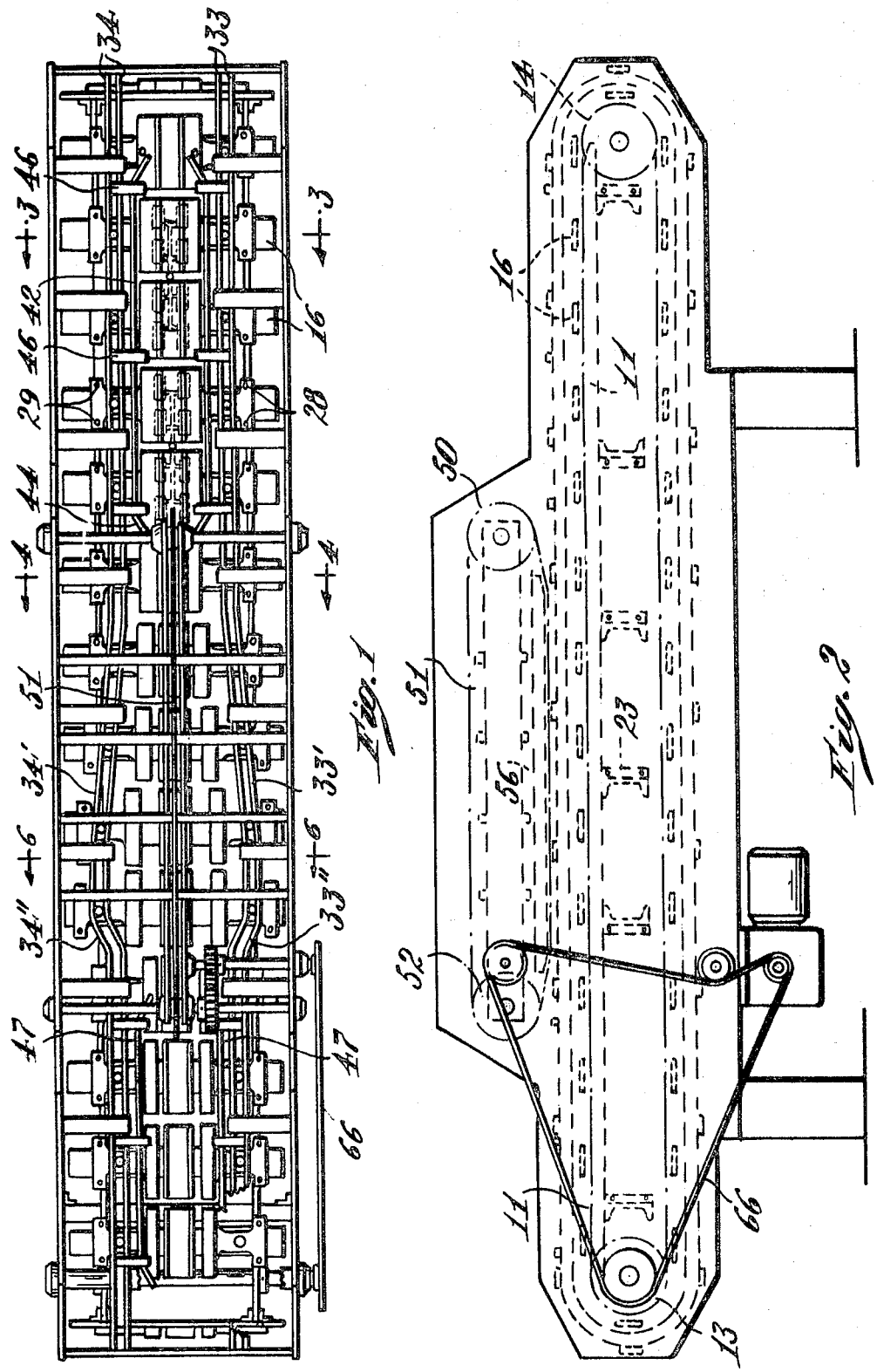

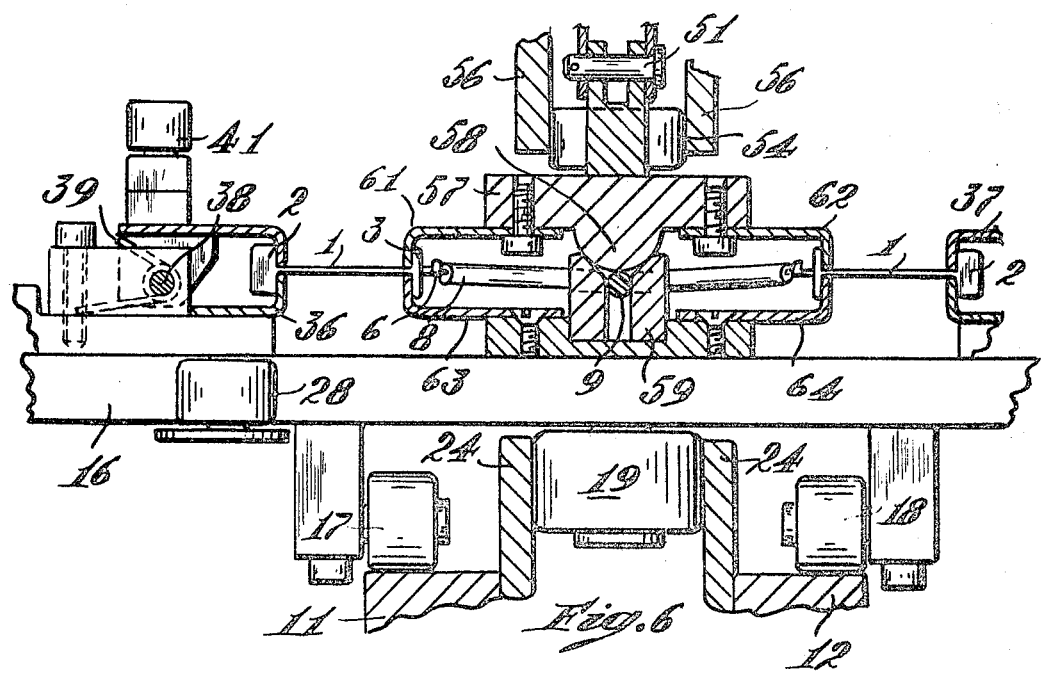
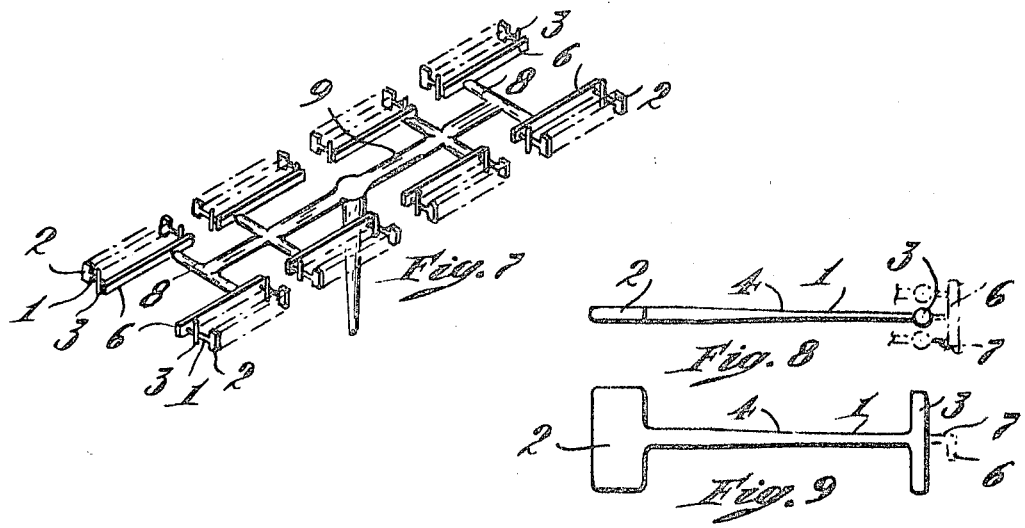
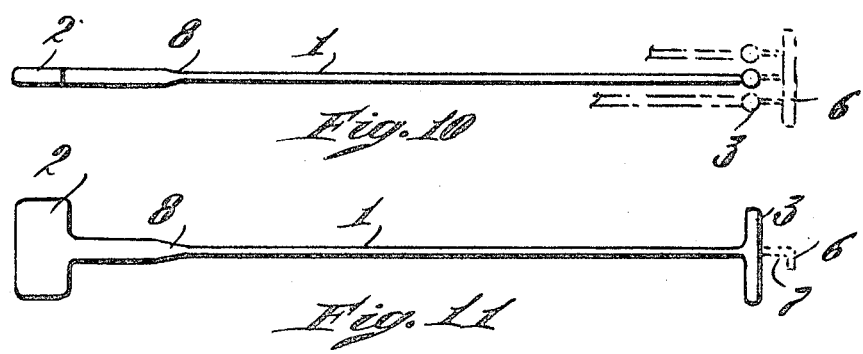

United States Patent Office 3,457,589
Patented July 29, 1969

3,457,589
APPARATUS FOR STRETCHING
PLASTIC FILAMENTS
George F. Gordon, Nashua, N.H., assignor to Dennison
Manufacturing Company, Framingham, Mass., a corporation of Nevada
Filed Dec. 12, 1966, Ser. No. 601,003
Int. Cl. D02j 1/22
U.S. Cl. 18—1                                    4 Claims

ABSTRACT OF THE DISCLOSURE

Apparatus comprising an endless carrier traveling in an orbital path with grippers mounted on the carrier in spaced relationship transversely of the path for gripping opposite ends of filaments, and means for increasing the distance between the grippers as they travel along a portion of the path, thereby to stretch the filaments.

---

This invention relates to fasteners for attaching articles together, such as a tag to merchandise or a button to a garment, and more particularly to devices comprising a filament, a head on one end of the filament and a cross-bar fast to the other end of the filament intermediate the ends of the cross-bar, all parts of the device comprising thermoplastic material and being integral. As disclosed in the copending application of Arnold R. Bone, Ser. No. 601,002 filed on even date herewith, it has been proposed to mold the aforesaid devices and stretch them to make the filaments smaller and stronger.

Objects of the present invention are to provide apparatus which stretches the filaments rapidly and uniformly and which is convenient and durable in use.

According to this invention the apparatus comprises a carrier, a driver for driving the carrier along a predetermined path, holders mounted on said carrier in spaced relationship transversely of said path for holding opposite ends of said filaments, and means for increasing the distance between said holders as they travel along a portion of said path. Preferably said carrier is endless and said path is orbital, said means comprises diverging cams extending along said path and cam followers connected to the grippers, and said holders comprise grippers including two jaws one movable toward the other and actuators for actuating the movable jaws, the actuators comprising cams and cam followers and the cam followers being associated with the movable jaws. The invention is further characterized by means in advance of said portion for closing the grippers, means beyond said portion for opening the grippers and means on the carrier between said grippers for holding the filaments on the carrier. In the preferred embodiment said last means is an endless chain traveling in an orbital path having a part parallel to said portion and means for driving the chain in synchronism with the aforesaid carrier, the chain having secondary grippers which counteract the pull of the aforesaid grippers.

Figure 3:
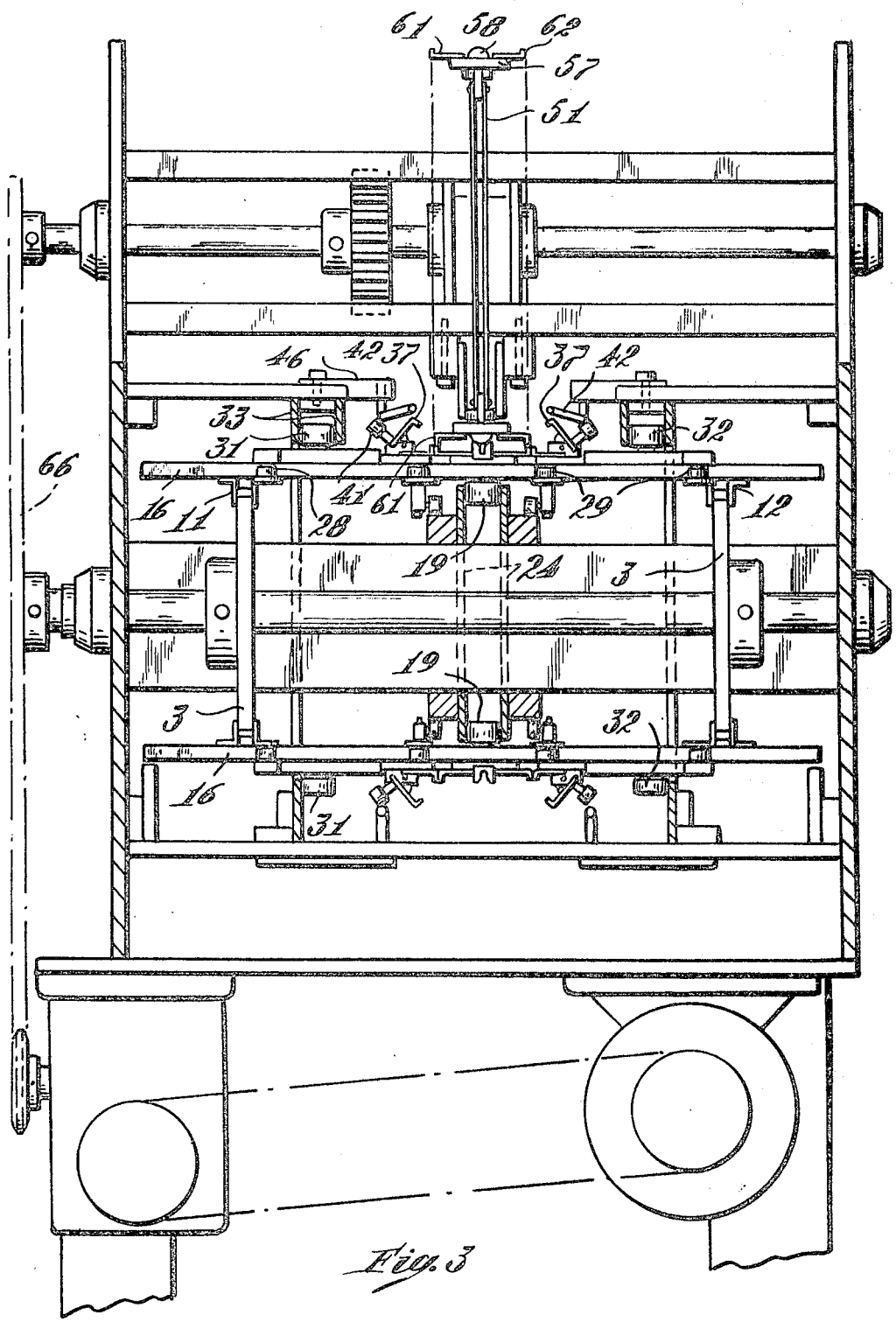
Figure 4:
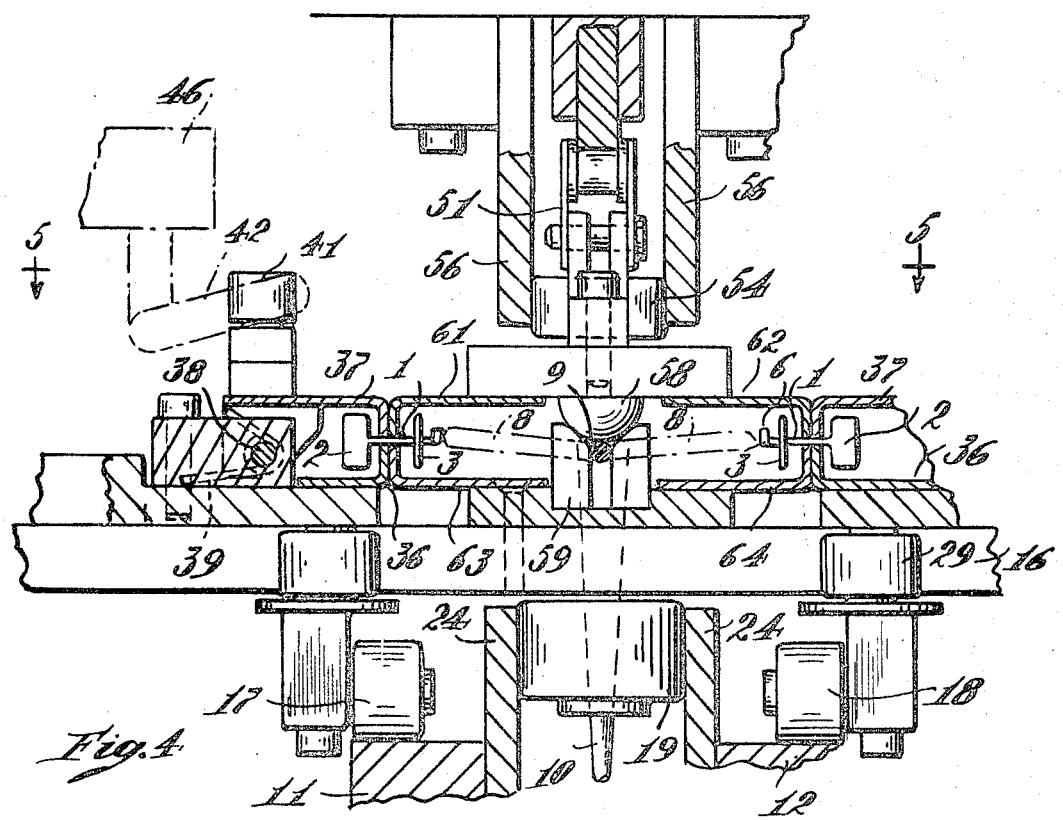
Figure 5:
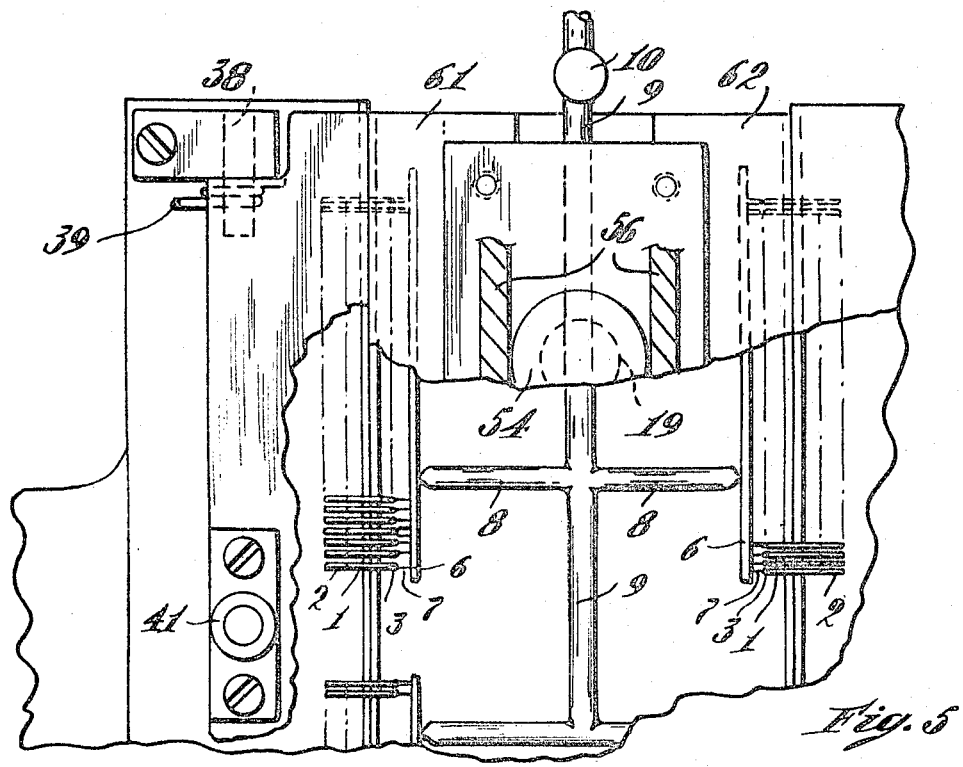

For the purpose of illustration a typical embodiment of the invention is shown in the accompanying drawings in which:

FIG. 1 is a plan view;
FIG. 2 is a side view;
FIG. 3 is a section on line 3—3 of FIG. 1;
FIG. 4 is a section on line 4—4 of FIG. 1;
FIG. 5 is a section on line 5—5 of FIG. 4;
FIG. 6 is a section on line 6—6 of FIG. 1;
FIG. 7 is an isometric view of a group of interconnected fasteners after being molded as one piece;
FIGS. 8 and 9 are side views of a single fastener cut away from the group; and FIGS. 10 and 11 are side views of the fastener after being stretched.

The blank shown in FIGS. 8 and 9 comprises a filament 1, a head 2 on one end of the filament, and a cross-bar 3 fast to the other end of the filament, all parts of the device comprising a single integral piece of nylon or other thermoplastic material in which the molecules are reoriented when the material is stretched thereby to strengthen the material. The filament 1 has minimum diameter adjacent the cross-bar and increased diameter toward the head from 4 approximately half its length. Preferably a plurality of the devices are molded together, the devices being connected by a rod 6 integrally joined to the cross-bars by necks 7. After the devices are molded the filaments are stretched to reduce their diameters as shown in FIGS. 10 and 11. Owing to variation in diameter of each filament, the portion of smallest diameter from 4 to the cross-bar 3 first stretches substantially to its elastic limit and then the stretching progresses from 4 toward the head 2. In the illustration the stretching is continued until it reaches point 8 adjacent the head. The stretching is preferably stopped before reaching the head to avoid danger of breaking the filament. This stretching not only reduces the diameter of the filament beyond the molding limit but, by reorienting the molecules of the thermoplastic material, it increases the tensile strength (p.s.i.) of the filament. While the devices may be severed from the necks 7 at any time after molding, preferably the devices are left interconnected in groups until they are used and are then severed successively as needed. When molded in groups the rods 6 are interconnected by rods 8 which are interconnected by a rod 9 to a stem 10 which is formed in the entrance to the mold. When laid in the machine of the present invention the aforesaid parts of the group of fasteners occupy the positions shown in FIGS. 4, 5 and 6.

According to this invention the apparatus comprises two sprocket chains 11 and 12 traveling in the direction of the arrows in FIG. 2 along an orbital path over pairs of sprocket wheels 13 and 14 (FIGS. 2 and 3). At regular intervals the chains are interconnected by cross-bars 16, the chains and cross-bars constituting a carrier. Journaled on the carrier are rollers 17 and 18 turning on axes parallel to the bars and rollers 19 turning on axes perpendicular to the bars (FIGS. 4 and 6). The rollers 17 and 18 roll on rails 21 and 22 to support the carrier along the upper stretch of its orbital path, the rails being supported by cross-beams 23 (FIGS. 2, 4 and 6) and the rollers 19 travel between guide rails 24 supported by the same beams (FIGS. 3, 4 and 6). Sliding lengthwise of the bars 16 are shoes 26 and 27 guided by rollers 28 and 29 which straddle the bars (FIGS. 1, 3, 4 and 6). The shoes are moved back and forth by cam followers 31 and 32 which follow track cams 33 and 34 (FIGS. 1 and 3), the track cams having diverging portions 33' and 34' to move the shoes apart from the positions shown in FIG. 4 to the positions shown in FIG. 6 and converging portions 33" and 34" to return the shoes to their inner positions (FIG. 1). Mounted on each of the shoes is a stationary jaw 36 and a jaw 37 pivoted at 38 (FIG. 6) to swing between the open position shown in FIG. 3 and the closed position shown in FIGS. 4 and 6. Each movable jaw is urged toward closed position by a spring 39 and is opened by a cam follower 41 cooperating with a cam 42 in the form of a rod extending from 43 and 44 in FIG. 1 which constitutes the loading portion of the orbital path, the rods being supported by brackets 46 (FIGS. 1, 3 and 4). Thus the jaws 37 are held open throughout the loading portion to receive groups of fasteners as shown in FIG. 5. After the jaws return to inner position they are opened by cams 47 to permit the removal of the stretched filaments.

Above the aforesaid parts is another endless chain 51 traveling in an orbital path over sprocket wheels 52 and 53 with its lower portion in parallel juxtaposition to the aforesaid carrier. In the lower portion of its orbital path the chain is guided by rollers 55 traveling between guides 56. The chain 51 carries blocks 57 on which are mounted hemispherical protuberances 58 to hold the rods 9 in the jaws 59 of the aforesaid carried (FIGS. 4 and 6). The blocks 57 also carry jaws 61 and 62 which cooperate with jaws 63 and 64 on the aforesaid carrier (FIGS. 4 and 6). The aforesaid sprocket chains are driven in synchronism by a motor M through a sprocket chain 66 (FIG. 2).

In operation groups of fasteners such as shown in FIG. 7 are dropped on the carrier in the aforesaid loading section extending from line 3—3 to line 4—4 in FIG. 1 where the jaws 37 are open as shown in FIG. 3. When the fasteners reach the end of cam rods 42 the jaws 37 close over the heads 2 of the filaments. At about the same time the filaments advance under the grippers 61 and 62 which close over the cross-bars 3 at the other ends of the filaments (FIGS. 3 and 4). As the fasteners pass through the portion of their path where the track cams 33 and 34 diverge (FIG. 1) the jaws 36 and 37 move apart from the positions shown in FIG. 4 to that shown in FIG. 6, thereby stretching the filaments as aforesaid. In passing the converging portions 33″ and 34″ of the track cams the grippers 36 and 37 return to their inner positions and are opened by cams 47 to permit the removal of the stretched filaments.

It should be understood that the present disclosure is for the purpose of illustration only and that this invention includes all modifications and equivalents which fall within the scope of the appended claims.

I claim:

1. Apparatus for stretching plastic filaments comprising a carrier, a driver for driving the carrier along a predetermined path, holders mounted on said carrier in spaced relationship transversely of said path for holding opposite ends of said filaments, means for increasing the distance between said holders as they travel along a portion of said path, said holders comprising grippers, means in advance of said portion for closing the grippers and means beyond said portion for opening the grippers and holding means on the carrier between said grippers for holding the filaments on the carrier.

2. Apparatus according to claim 1 wherein said holding means comprises a second endless carrier traveling in an orbital path having a part parallel to said portion and means for driving the second carrier in synchronism with the first carrier.

3. Apparatus according to claim 2 wherein said holding means comprises secondary grippers which counteract the pull of said grippers.

4. For stretching a plastic filament having a head on each end, one head comprising a cross-bar the ends of which project on opposite sides of the filament, apparatus comprising a carrier movable along a predetermined path, grippers mounted on the carrier in spaced relationship transversely of said path for holding said heads, one gripper comprising two jaws extending behind said ends of a cross-bar respectively, means for increasing the distance between said grippers as they travel along a portion of said path, means in advance of said portion for closing said jaws behind the ends of a cross-bar, and means beyond said portion for opening the jaws.

References Cited

UNITED STATES PATENTS

| | | | |
|---|---|---|---|
| 2,473,404 | 6/1949 | Young | 18—1 |
| 2,923,966 | 2/1960 | Tooke | 18—1 |
| 2,974,361 | 3/1961 | Gerck et al. | 18—1 |
| 3,135,993 | 6/1964 | Ryan. | |
| 3,150,443 | 9/1964 | Kampf | 18—1 |
| 3,256,558 | 6/1966 | Anderson et al. | 18—1 |
| 3,305,889 | 2/1968 | Lewis et al. | 18—1 |

WILLIAM J. STEPHENSON, Primary Examiner